June 4, 1929.  S. SWENSON  1,716,197
BATTERY POST
Filed Nov. 30, 1927
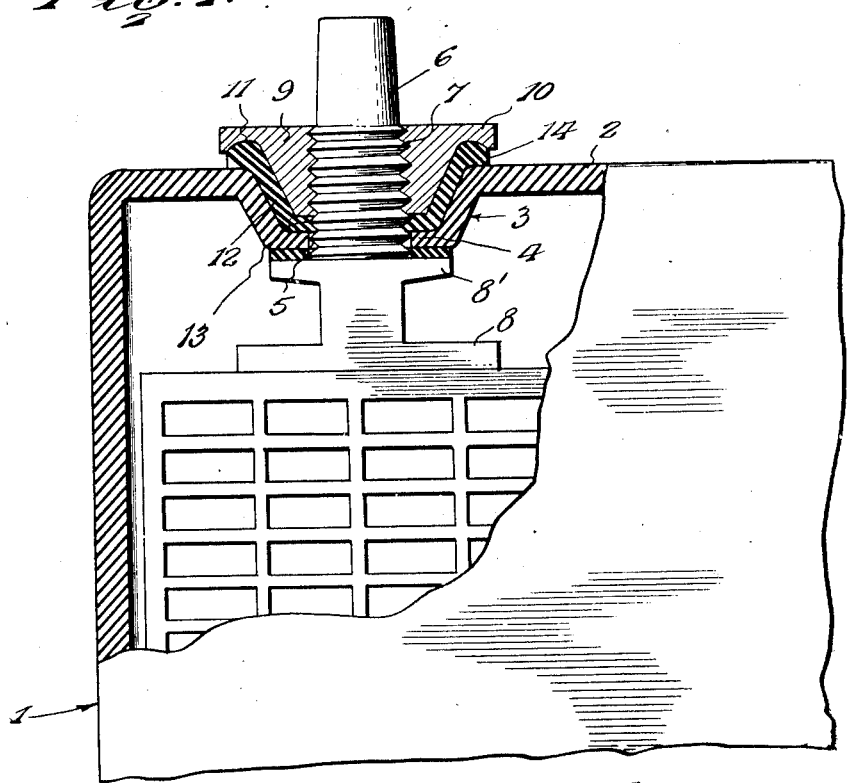
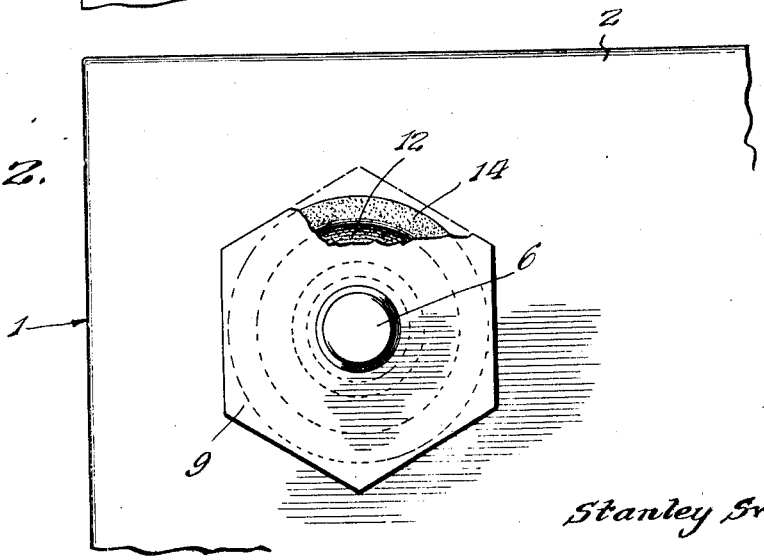
Inventor
Stanley Swenson.
By Lacey & Lacey, Attorneys Patented June 4, 1929.

1,716,197

UNITED STATES PATENT OFFICE.

STANLEY SWENSON, OF STOCKHOLM, WISCONSIN.

BATTERY POST.

Application filed November 30, 1927. Serial No. 236,776.

The present invention is directed to improvements in battery posts.

The primary object of the invention is to provide a device of this character so constructed that the terminal posts will be firmly held in place and against lateral displacement within the top wall opening of the container.

Another object of the invention is to provide a device of this kind so constructed that the terminal posts will be effectively packed in order to prevent leakage of solution from the container.

Another object of the invention is to provide a device of this character which is extremely simple in construction, durable and effective in operation.

With these and other objects in view, this invention resides in the novel features of construction, formation, combination and arrangement of parts to be hereinafter more fully described, claimed and illustrated in the accompanying drawing, in which,—

Figure 1 is a sectional view, partly in section and partly in elevation.

Figure 2 is a fragmentary top plan view.

Referring to the drawing, 1 designates the container, the top wall 2 thereof having a hollow boss 3 formed therein, the wall of the boss being tapered, and having an annular horizontal flange 4 defining a central opening 5, and through which the terminal post 6 extends, said post being threaded, as at 7, for a portion of its length.

The terminal post, as customary, is connected with the plate strap 8, said strap having an annular flange 8' associated therewith.

A lead nut 9 is employed and has a tapered side wall, the taper of which corresponds to the taper of the wall of the boss, said nut having an annular shoulder 10 which carries an annular groove 11 thereunder, the purpose of which will be later explained.

Before the nut is threaded upon the post 6, a soft rubber gasket 12 is placed in the cavity of the boss 3, said gasket being provided with an annular flange 13 designed to rest upon the flange 4, the upper edge of the gasket having an annular rim 14 adapted to rest upon the top 2 and under the shoulder 10 of the nut.

It will be obvious that when the nut 9 is screwed downwardly, its side walls will compress the wall of the gasket, while the flange 10 thereof will clamp the rim 14 of the gasket tight upon the top 2 and owing to the presence of the groove 11, lateral spreading of the rim will be positively prevented.

A soft rubber washer 15 is interposed between the flange 8 and the flange 4 of the boss.

From the foregoing description it will be apparent that a joint has been provided for this purpose which will effectively seal the terminal post in the top opening of the container, and will rigidly maintain the same against sidewise movement with respect to the box 2.

Having thus described the invention, I claim:

The combination with a battery container having a hollow boss in its top wall, said boss being provided with a central opening, of a terminal post extended through the opening, a gasket of pliable material engaged in the cavity of the boss and having a rim upon its upper end for engagement with the top of the wall, said gasket having a flange upon its lower end for engagement with the bottom wall of the boss, a nut threaded upon the post and having a shoulder for engagement with the rim for clamping the same upon the wall, the lower end of said nut being engaged with said flange.

In testimony whereof I affix my signature.

STANLEY SWENSON. [L. S.]